(12) United States Patent
Fukshima et al.

(10) Patent No.: US 6,822,784 B2
(45) Date of Patent: Nov. 23, 2004

(54) LIGHT-BEAM DEFLECTING DEVICE WITH PHOTONIC CRYSTAL, OPTICAL SWITCH USING THE SAME, AND LIGHT-BEAM DEFLECTING METHOD

(75) Inventors: Hiroshi Fukshima, Kadoma (JP); Ken'ichiro Tanaka, Neyagawa (JP); Yasufumi Masaki, Hirakata (JP); Hitomichi Takano, Hirakata (JP); Katsumi Yoshino, Kishiwada (JP)

(73) Assignee: Matsushita Electric Works, Ltd, Kadoma (JP)

( * ) Notice: Subject to any disclaimer, the term of this patent is extended or adjusted under 35 U.S.C. 154(b) by 39 days.

(21) Appl. No.: 10/096,251

(22) Filed: Mar. 13, 2002

(65) Prior Publication Data

US 2002/0135863 A1 Sep. 26, 2002

(30) Foreign Application Priority Data

Mar. 22, 2001 (JP) ........................................ 2001-082863

(51) Int. Cl.[7] ........................ G02F 26/08; G02F 26/00; G02B 6/26; B41J 2/435
(52) U.S. Cl. ...................... 359/298; 359/290; 359/291; 385/16; 347/250; 347/235
(58) Field of Search .................................. 359/298, 291, 359/290, 245, 241, 124, 127, 128, 129; 385/16, 31–37; 398/79, 82, 85, 86; 347/235, 250

(56) References Cited

U.S. PATENT DOCUMENTS 6,064,506 A    5/2000   Koops .......................... 359/237
6,404,947 B1 * 6/2002   Matsuda ....................... 385/24
6,448,997 B1 * 9/2002   Koide .......................... 347/250
6,522,448 B2 * 2/2003   Baba et al. ................... 359/241

FOREIGN PATENT DOCUMENTS

EP    1 089 095 A2    4/2001
JP    10-90634        4/1998
JP    2001-13439      1/2001
JP    2001-013439   * 1/2001

OTHER PUBLICATIONS

A. Figotin, Yu.A. Godin, I. Vitebsky. Tunable Photonic Crystals, Mat. Res. Soc. Symp. Proc. vol. 603, 2000. pp. 195–200.

H.W.P. Koops. "Photonic Crystals Built By Three–Dimensional Additive Lithography Enable Integrated Optics Of High Density." 1996. SPIE vol. 2849, pp. 248–256.

* cited by examiner

*Primary Examiner*—Georgia Epps
*Assistant Examiner*—Jack Dinh
(74) *Attorney, Agent, or Firm*—Oblon, Spivak, McClelland, Maier & Neustadt, P.C.

(57) ABSTRACT

A compact light-beam deflecting device with a photonic crystal is provided, which has the capability of deflecting a light beam incident on the photonic crystal by a controlled angle to output a transmitted light beam having a desired direction from the photonic crystal. This light-beam deflecting device comprises the photonic crystal designed to have a photonic band gap wavelength that is different from a wavelength of a light beam to be incident on the photonic crystal, and a deflection controller for applying an amount of energy to the photonic crystal to deflect the light beam incident on a side of the photonic crystal, and to provide a transmitted light beam, which forms the desired angle with respect to the light beam, from the other side of the photonic crystal.

31 Claims, 10 Drawing Sheets

LIGHT-BEAM DEFLECTING DEVICE WITH PHOTONIC CRYSTAL, OPTICAL SWITCH USING THE SAME, AND LIGHT-BEAM DEFLECTING METHOD

BACKGROUND OF THE INVENTION

1. Field of the Invention

The present invention relates to a light-beam deflecting device with a photonic crystal, an optical switch using the same, and a method of deflecting a light beam with a controlled angle by use of the photonic crystal.

2. Disclosure of the Prior Art

Photonic crystal is of a multi-dimensional periodic structure obtained by periodically arranging at least two materials having different dielectric constants at an interval substantially equal to a wavelength of light. In the expectation that the photonic crystal would remarkably enhance the control of light, it is being vigorously developed as optical devices of the next generation.

For example, an optical switch with a photonic crystal $1'$ having a two-dimensional periodic structure is disclosed in Japanese Patent Early Publication [kokai] No. 10-90634. As shown in FIG. 17, this optical switch is for switching between the ON position (transmission) where a light beam incident on the photonic crystal (=incident light beam) is allowed to pass through the photonic crystal, and the OFF position (reflection) wherein the incident light beam is reflected from the photonic crystal to prevent the transmission of the incident light beam.

That is, light beams provided from a pair of optical fibers $12a$, $12b$ are incident on the photonic crystal $1'$ through collimator lenses $14a$, $14b$ and polarizers $15a$, $15b$. The optical switch comprises a means for irradiating a control light 21 to the photonic crystal $1'$ through a circular polarizer 22. The irradiation of the control light 21 causes a change in a photonic band gap (PGB) structure of the photonic crystal $1'$, so that it becomes possible to switch between the ON and OFF positions. In the ON position, the transmitted light beam passing through the photonic crystal $1'$ is output through a pair of polarizers $16a$, $16b$.

However, since the purpose of the above optical switch is to switch between the ON position for allowing the incident light beam to pass through the photonic crystal and the OFF position for reflecting the incident light beam from the photonic crystal, this optical switch merely provides the presence or absence of the transmitted light beam as the output. This becomes to narrow application areas of the optical switch.

On the other hand, if a direction of the transmitted light beam provided from the photonic crystal can be controlled by deflecting the light beam incident on the photonic crystal, it is expected to provide a new optical switch using the photonic crystal, which comprises an optical input terminal for receiving the light beam incident on the photonic crystal and plural optical output terminals each having the capability of providing the transmitted light beam from the photonic crystal. That is, according to such a new optical switch, since the transmitted light beam can be provided from a desired one of the optical output terminals by controlling the deflection of the incident light beam, this kind of optical switch will find widespread application.

SUMMARY OF THE INVENTION

Therefore, a primary concern of the present invention is to provide a compact light-beam deflecting device with a photonic crystal, which has the capability of deflecting a light beam incident on a side of the photonic crystal by a controlled angle to output a transmitted light beam having a desired direction from the other side of the photonic crystal.

That is, this light-beam deflecting device comprises a photonic crystal designed to have a photonic band gap wavelength that is different from a wavelength of a light beam to be incident on the photonic crystal, and a deflection controller for applying an amount of energy to the photonic crystal to deflect the light beam incident on an incident side of the photonic crystal, and provide the transmitted light beam, which forms a desired angle with respect to the light beam, from a side other than the incident side of the photonic crystal.

It is preferred that the photonic crystal comprises at least two materials having different refractive indexes, and the deflection controller controls a ratio of refractive index between those materials by applying the energy to the photonic crystal.

When at least one of the materials of the photonic crystal is an electro-optic material, it is preferred that the deflection controller applies an electric field to the photonic crystal as the energy. In this case, no mechanical external force is applied to the photonic crystal as the energy. Therefore, the light-beam deflecting device is allowed to stably operate for an extended time period with a high degree of reliability. In addition, since the deflection controller electrically controls electric field strength applied to the photonic crystal to change the deflection angle of the incident light beam, it is possible to provide the compact light-beam deflection device having a quick responsivity.

Another concern of the present invention is to provide a new optical switch using the above-described light-beam deflection device, which presents advantages of preventing cross talk of optical signals and ensuring a high transmitting efficiency.

That is, this optical switch comprises the light-beam deflection device of the present invention, an optical input terminal provided at the incident side of the photonic crystal, through which the photonic crystal receives the light-beam (=incident light beam); and a plurality of optical output terminals provided at the side other than the incident side of the photonic crystal, from which said transmitted light beam is selectively output.

More specifically, the new optical switch of the present invention comprises the above light-beam deflecting device, an optical input terminal provided at the incident side of the photonic crystal, through which the photonic crystal receives the incident light beam; and at least two optical output terminals. The optical output terminals includes a first optical output terminal provided at a side other than the incident side of the photonic crystal to output a first transmitted light beam passing through the photonic crystal, and a second optical output terminal provided at a side other than the incident side of the photonic crystal to output a second transmitted light beam, which forms a desired angle with respect to the incident light beam, and has a different direction from the first transmitted light beam.

A further concern of the present invention is to provide a method of deflecting a light beam incident on a side of the photonic crystal by a controlled angle to output a transmitted light beam having a desired direction from the other side of the photonic crystal.

That is, this method comprises the steps of providing a light beam having a wavelength other than a photonic band gap wavelength of the photonic crystal on a side of the photonic crystal, and deflecting the light beam incident on the side of the photonic crystal by applying an amount of energy to the photonic crystal to provide a transmitted light beam, which forms a desired angle with respect to the light beam, from the other side of the photonic crystal.

These and still other objects and advantages of the present invention will become more apparent from preferred embodiments of the present invention explained in detail below, referring to the attached drawings.

The present disclosure relates to subject matter contained in Japanese Patent application No. 2001-82863, filed on Mar. 22, 2001, the disclosure of which is expressly incorporated herein by reference in its entirety.

PREFERRED EMBODIMENTS OF THE INVENTION

Light-beam deflecting devices and optical switches using the same of the present invention are explained in detail according to the following preferred embodiments.

Figure 1A:
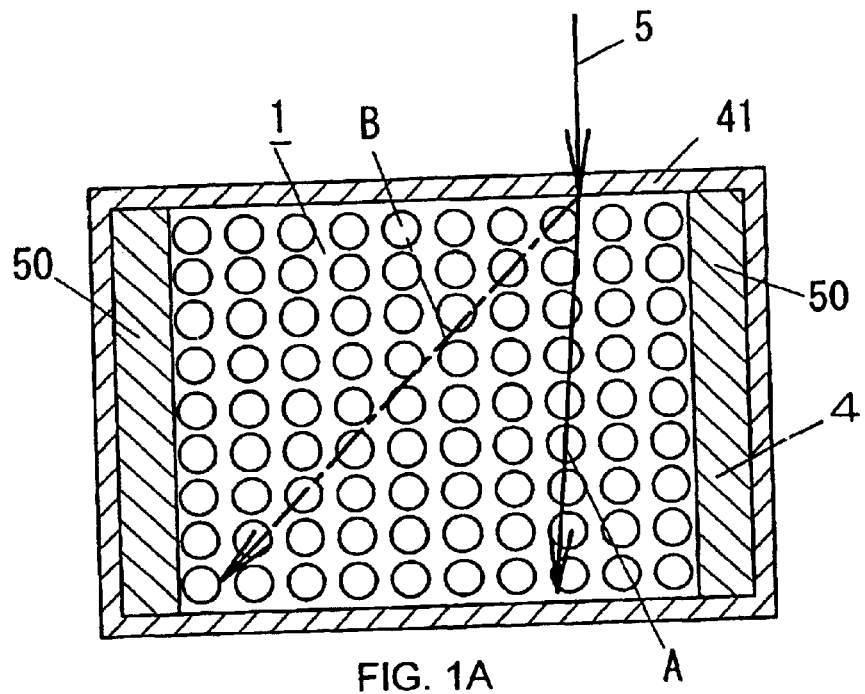
FIGS. 1A and 1B are schematic cross-sectional and perspective views of a light-beam deflecting device according to a preferred embodiment of the present invention.
Figure 1B:
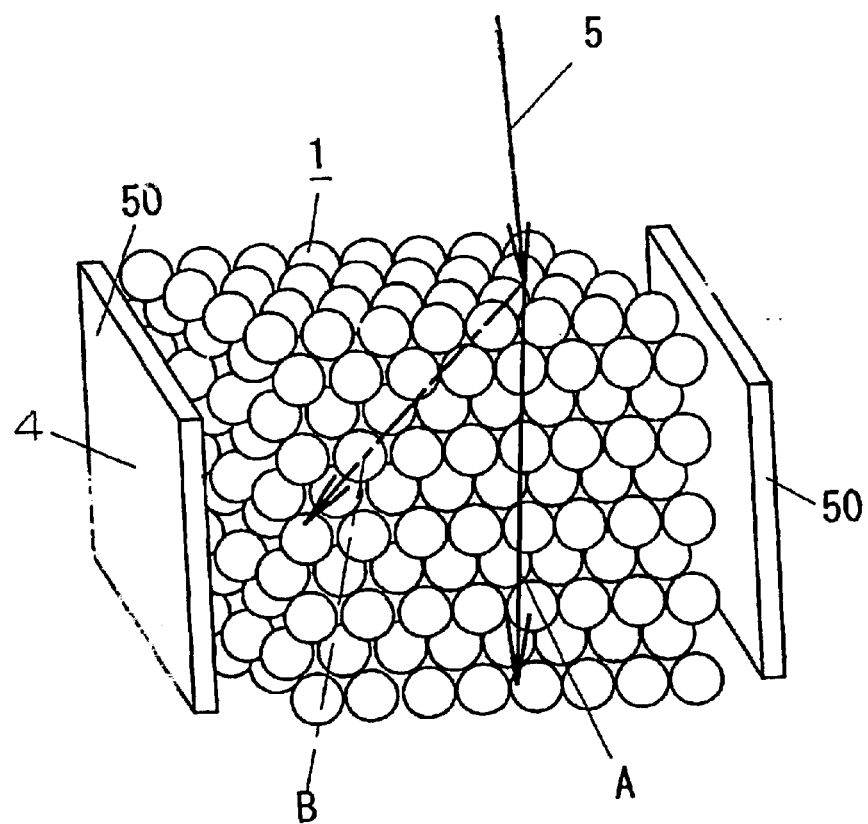

The light-beam deflecting device of the present invention, for example, as shown in FIGS. 1A and 1B, comprises a photonic crystal 1 designed to have a photonic band gap wavelength that is different from a wavelength of a light beam to be incident on the photonic crystal, and a deflection controller 4 for applying an amount of energy to the photonic crystal to deflect a light beam 5 incident on an incident side of the photonic crystal, and provide the transmitted light beam, which forms a desired angle with respect to the light beam, from a side other than the incident side of the photonic crystal.

The photonic crystal 1 used in the present invention is of a multi-dimensional periodic structure obtained by periodically arranging at least two materials having different dielectric constants at an interval substantially equal to a wavelength of light. Alternatively, the photonic crystal 1 is of an artificial periodic or quasi-periodic structure formed with at least two materials having different refractive indexes, which are periodically arranged at an interval substantially equal to a half of the wavelength of a light beam to be incident on the photonic crystal. The thus formed photonic crystal has a photonic band gap structure, by which an angle of a transmitted light beam passing through the photonic crystal with respect to the light beam incident on the photonic crystal is determined.

Figure 2A:
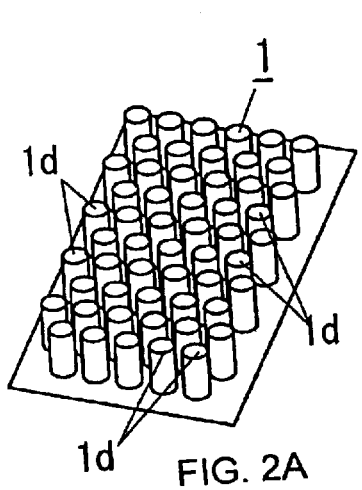
FIGS. 2A to 2E are perspective views illustrating structures of photonic crystals that can be used in the light-beam deflecting device of the present invention.
Figure 2B:
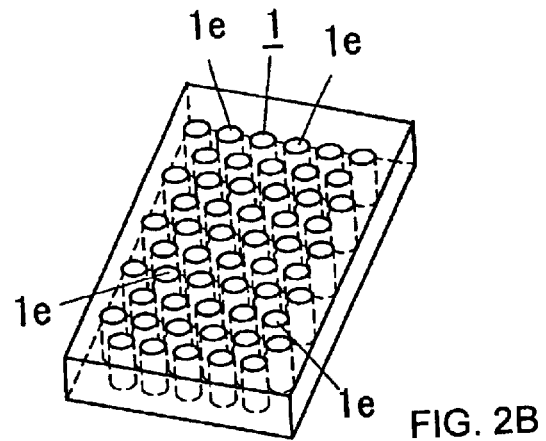

In the light-beam deflecting device of the present invention, for example, a photonic crystal 1 shown in FIG. 2A can be used, which is of a 2-dimensional periodic structure obtained by periodically arranging cylindrical bodies 1d of a first material at a required interval. In this case, a second material having a different dielectric constant from the first material is filled in spaces between adjacent cylindrical bodies 1d. Air may be used as the second material. Alternatively, a photonic crystal 1 shown in FIG. 2B may be used, which is substantially the same as the structure of FIG. 2A except that the first and second materials are made of the air and a solid material, respectively. That is, the photonic crystal 1 of FIG. 2B is composed of a rectangular solid of the second material and cylindrical air spaces 1e periodically formed at the required interval in the rectangular solid.

Figure 2C:
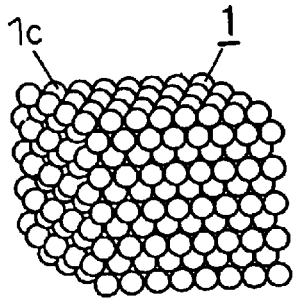
Figure 2D:
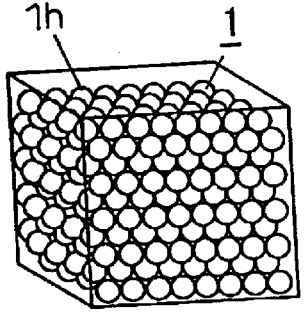

In addition, a photonic crystal 1 shown in FIG. 2C can be used, which is of a 3-dimensional periodic structure obtained by periodically arranging fine spherical bodies 1c of a first material at a required interval. This structure is also named as an artificial OPAL structure. In this case, a second material having a different dielectric constant from the first material is filled in spaces between adjacent spherical bodies 1c. Air may be used as the second material. Alternatively, a photonic crystal 1 shown in FIG. 2D may be used, which is substantially the same as the structure of FIG. 2C except that the first and second materials are made of the air and a solid material, respectively. That is, the photonic crystal 1 of FIG. 2D is composed of a cube of the second material and spherical air spaces 1h periodically formed at the required interval in the cube. This structure is also named as an inverse OPAL structure.

Figure 2E:
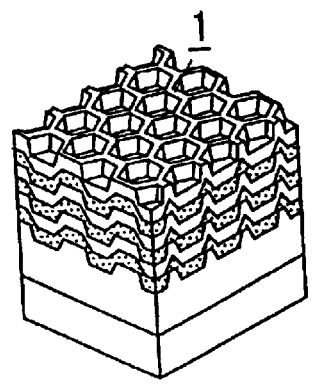

In addition, a photonic crystal 1 shown in FIG. 2E can be used, which is of an artificial laminate structure comprising a substrate 10 (e.g., silicon) having a honeycomb surface, in which hexagonal concaves (not shown) are periodically formed at a required interval, and a required number of thin films laminated on the honeycomb surface. Each of the thin films is composed of a bottom layer 1a of a first material (e.g., amorphous Si) and a top layer 1b of a second material (e.g., $SiO_2$). Thus, since a 2-dimensional periodic structure of the hexagonal concaves is formed in the honeycomb surface of the substrate 10, and a periodic structure of the alternative arrangement of the bottom and top layers 1a, 1b is formed in a height direction of the substrate, these provide a 3-dimensional periodic structure as a whole.

The photonic crystal 1 for the light-beam deflecting device of the present invention is not limited to the photonic crystals described above. Conventional photonic crystals having another structures or photonic crystals having new structures may be used for the light-beam deflecting device of the present invention.

In the present invention, the photonic crystal 1 for the light-beam deflecting device is designed such that a wavelength of a light beam (=incident light beam 5) to be incident on the photonic crystal is different from a photonic band gap wavelength of the photonic crystal. Therefore, when the wavelength of the incident light beam is determined in advance, the structure and the materials of the photonic crystal are designed such that the wavelength of photonic band gap is different from the wavelength of the incident light beam. On the contrary, when the structure and the materials of the photonic crystal are determined in advance, a light beam having a wavelength different from the photonic band gap wavelength of the photonic crystal is used as the incident light beam. Even when a light beam having the photonic band gap wavelength is incident on a surface (=incident surface) of the photonic crystal, no transmitted light beam can be obtained from the other surface of the photonic crystal. In other words, the incident light beam having the wavelength substantially equal to the photonic band gap wavelength reflects from the incident surface, but can not pass through the photonic crystal. Therefore, only when the light beam having a wavelength different from the photonic band gap wavelength is incident on the photonic crystal, it is possible to output the transmitted light beam from the photonic crystal.

By the way, as an optical property peculiar to the photonic crystal, it is well known that when the wavelength of a light beam to be incident on the photonic crystal changes by only 1%, the deflection angle of the light beam incident on the photonic crystal largely increases by about 50 degrees. This phenomenon was found in the year 1999, and named as the super prism effect. That is, this phenomenon originates from a large change in the shape of a photonic dispersion surface caused by a small change in wavelength of the incident light beam. When the wavelength of incident light beam changes by 1%, the incident light beam passes a different photonic dispersion surface, so that a large deflection angle of the incident light beam is obtained. However, when using the photonic crystal for optical devices such as optical switch, it is required to provide an output light beam (=transmitted light beam) by deflecting the incident light beam having a specific wavelength at a desired angle. The present invention addresses this requirement by using the deflection controller 4 explained in detail below.

As described above, the present invention is built on premises that by providing an incident light beam having a wavelength other than the photonic band gap wavelength on the photonic crystal, the incident light beam is allowed to pass through the photonic crystal without being reflected therefrom. On this precondition, the present invention is characterized by deflecting the incident light beam incident on a side of the photonic crystal by applying an amount of energy to the photonic crystal to provide a transmitted light beam, which forms a desired angle with respect to the light beam, from the other side of the photonic crystal.

Preferred embodiments of the deflection controller of the present invention are explained in detail below.

Figure 3A:
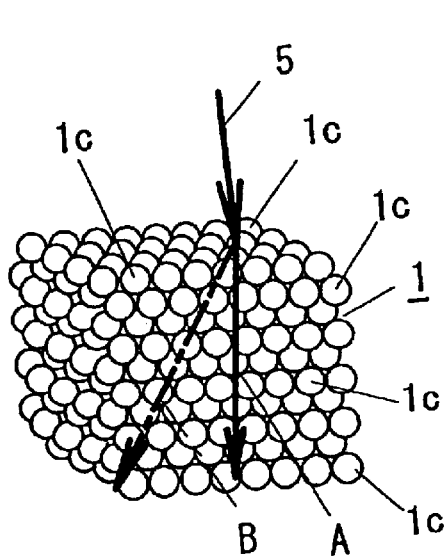
FIGS. 3A and 3B are perspective views illustrating optical paths in the photonic crystal of FIG. 2C.
Figure 3B:
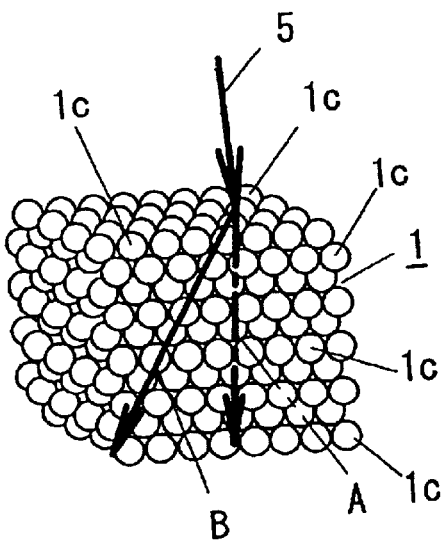
Figure 4A:
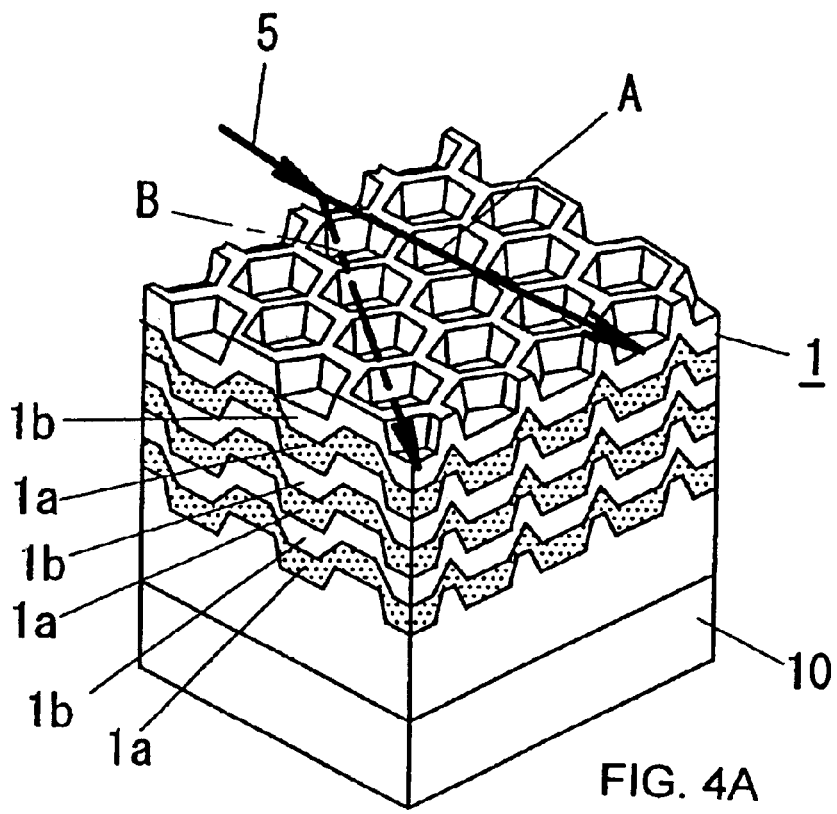
FIGS. 4A and 4B are perspective views illustrating optical paths in the photonic crystal of FIG. 2E.
Figure 4B:
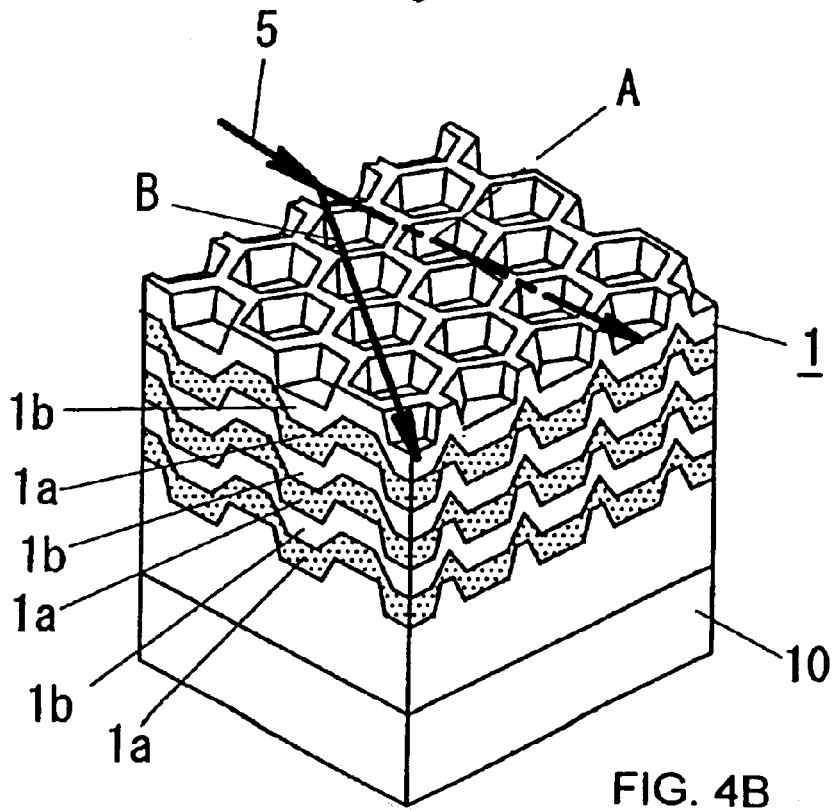

The deflection controller 4 can change a photonic band structure of the photonic crystal 1 by applying the amount of energy to the photonic crystal to cause a change in an optical path (or deflection angle) of the light beam incident on the photonic crystal. When an incident light beam having a specific wavelength is provided on a side of the photonic crystal 1 without the deflection controller 4 being not operated, the incident light beam 5 propagates along the optical path A shown by the solid line in FIGS. 3A and 4A, so that the transmitted light beam is output from a first position on the other side of the photonic crystal. In this case, the incident light beam 5 does not propagate along the optical path B shown by the dotted line. Next, when the deflection controller 4 is operated to change the photonic band gap structure of the photonic crystal 1, the incident light beam 5 propagates along the optical path B shown by the solid line in FIGS. 3B and 4B, so that the transmitted light beam is output from a second position on the other side of the photonic crystal 1. In this case, the incident light beam 5 does not propagate along the optical path A shown by the dotted line.

In other words, when a wavelength of the light beam passing through the photonic crystal 1 has a specified wavelength, the light beam travels in a direction of potential gradient of the photonic dispersion surface. Therefore, when a period of the periodic structure of the photonic crystal or a ratio of refractive index between the materials that make up the photonic crystal 1 is changed by the deflection controller 4, the photonic dispersion surface is changed, so that the light beam passing through the photonic crystal can be deflected.

When the photonic crystal 1 comprises at least two materials having different refractive indexes, it is preferred that the deflection controller 4 controls the ratio of refractive index between those materials by applying the energy to the photonic crystal 1 to provide the transmitted light beam, which forms a desired angle with respect to the incident light beam, from the photonic crystal. In addition, when at least one of the materials is an electro-optic material, it is preferred that the deflection controller 4 applies an electric field (including the electric field caused by light) to the photonic crystal 1 as the energy.

For example, as shown in FIGS. 1A and 1B, the deflection controller 4 comprises a pair of planar electrodes 50 disposed at opposite sides of the photonic crystal 1, power source (not shown) for supplying a voltage between the electrodes, and a voltage controller (not shown). In FIG. 1A, the numeral 41 designates a supporting member for supporting the electrodes 50 and the photonic crystal 1. It is preferred that the supporting member 41 and the electrodes 50 are made of a material that is optically transparent to the incident light beam 5.

As the electro-optic material for the photonic crystal, it is possible to use a material having a nonlinear optical effect such as a Pockels effect that the refractive index changes in proportion to electric field strength, or an optical Kerr effect (third-order nonlinear optical effect) that the refractive index changes in proportion to the square of electric field strength. In the present embodiment, it is preferred to use the material having a Pockels coefficient of $1 \times 10^{-12} \sim 1000 \times 10^{-12}$ m/V. For example, the electro-optic material comprises $KH_2PO_4$, $KDS_2PO_4$, $NH_4H_2PO_4$, $RbH_2PO_4$, $CsD_2AsO_4$ (DCDA), $BaTiO_3$, $Ba_{1-x}Sr_xTiO_3$, $LiNbO_3$, $KNbO_3$, $KTiOPO_4$(KTP), $KTiOAsO_4$(KTA), $Pb_xLa_{1-x}(Ti_yZr_{1-y})O_3$(PLZT), and so on.

According to the above-described deflection controller 4, when a required voltage is applied between the electrodes 50, an electric field is applied to the photonic crystal 1. The applied electric field changes the ratio of refractive index between the materials that make up the photonic crystal, so that a change in the photonic band gap structure of the photonic crystal is caused. The deflection controller 4 of the present embodiment can change the ratio of refractive index by a magnitude of 0.1 to about 1%.

As described above, the deflection controller 4 of the present invention can control the electric field to be applied to the photonic crystal 1 to change the ratio of refractive index of the photonic crystal. This change in the ratio of refractive index brings a change in the photonic dispersion surface, so that the control of the deflection angle of the incident light beam 5 becomes possible. Thus, since the deflection angle is controlled by adjusting the voltage applied between the electrodes 50, it is possible to realize a higher response speed of the light-beam deflecting device. In addition, since the deflection controller 4 of the present embodiment does not apply a mechanical external force to the photonic crystal 1, there is an advantage that the reliability in operations of the light-beam deflecting device is easily maintained for an extended time period.

As another preferred embodiment of the deflection controller 4 of the present invention, when at least one of the materials that make up the photonic crystal 1 is an acousto-optic material, it is preferred that the deflection controller applies ultrasonic waves to the photonic crystal as the energy.

Figure 5:
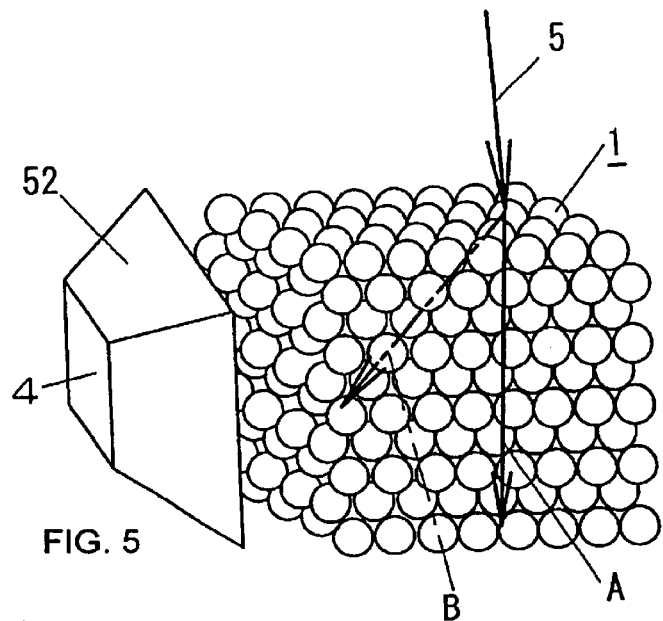
FIG. 5 is a schematic perspective view of the light-beam deflecting device using ultrasonic waves according to another preferred embodiment of the present invention.

As shown in FIG. 5, this deflection controller 4 has an ultrasonic-wave applying unit 52 for applying the ultrasonic waves to the photonic crystal 1. For example, the ultrasonic-wave applying unit 52 comprises a transducer using an ultrasonic oscillator (e.g., piezoelectric element), and a power source (not shown) for supplying electric power to the transducer. The acousto-optic material can be selected from materials such as HgS, $Tl_3AsS_4$, Ge, Te, ZnTe, $Pb_5Ge_3O_{11}$, and so on, according to the wavelength of the light beam to be incident on the photonic crystal. The deflection controller 4 of the present embodiment can change the ratio of refractive index of the photonic crystal by a magnitude of 0.1 to about 1%.

According to the deflection controller 4 described above, a periodic change in refractive index of the photonic crystal 1 is induced by the ultrasonic waves applied thereto, so that light is diffracted by the Brillouin scattering of photons by phonons. That is, the ratio of refractive index of the photonic crystal is changed by the application of the ultrasonic waves, so that a change in the photonic band structure is caused. Since the deflection angle of the light beam incident on the photonic crystal 1 is controlled by adjusting a frequency of the ultrasonic waves, it is possible to provide the light-beam deflecting device having a responsivity up to a relatively high frequency. In addition, since the deflection controller 4 of the present embodiment does not apply a mechanical external force to the photonic crystal 1, there is an advantage that the reliability in operations of the light-beam deflecting device is easily maintained for an extended time period.

As another preferred embodiment of the deflection controller 4 of the present invention, the deflection controller may comprise an external-force applying unit for applying an external force as the energy to the photonic crystal 1 to cause changes in dimension of the photonic crystal. For example, the external-force applying unit comprises a piezoelectric material disposed adjacent to the photonic crystal. In this case, since the dimensions of the photonic crystal 1 can be directly and uniformly changed by use of the piezoelectric material, it is possible to improve the reliability in operations of the light-beam deflecting device.

Figure 6A:
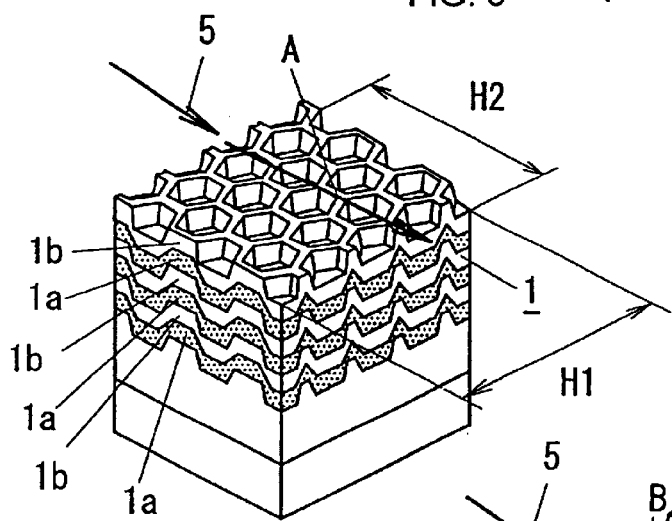
FIGS. 6A and 6B are schematic perspective views showing operations of the light-beam deflecting device with an external-force applying unit of the present invention.
Figure 6B:
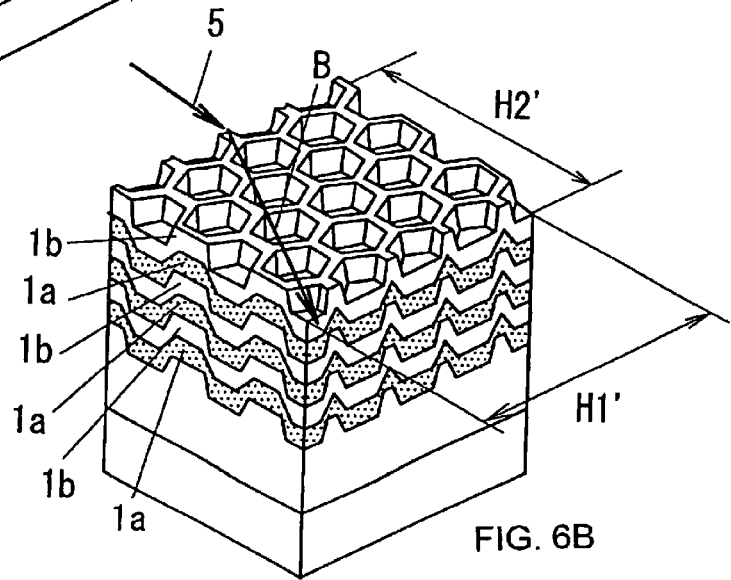

For example, as shown in FIG. 6A, when the deflection controller 4 of this embodiment is not operated, the photonic crystal 1 has the dimensions H1, H2. At this time, a light beam 5 incident on a side of the photonic crystal propagates along an optical path A in the photonic crystal 1, so that a transmitted light beam is output from a first position on the other side of the photonic crystal. On the other hand, as shown in FIG. 6B, when the deflection controller 4 is operated, the dimensions H1, H2 of the photonic crystal 1 change to H1'(>H1) and H2'(>H2), respectively. These changes in dimensions of the photonic crystal 1 bring a change in the photonic band structure, so that a change in the ratio of refractive index between the materials that make up the photonic crystal is caused. Therefore, the light beam 5 incident on the side of the photonic crystal propagates along an optical path B in the photonic crystal 1, the transmitted light beam is output from a second position on the other side of the photonic crystal.

Figure 7:
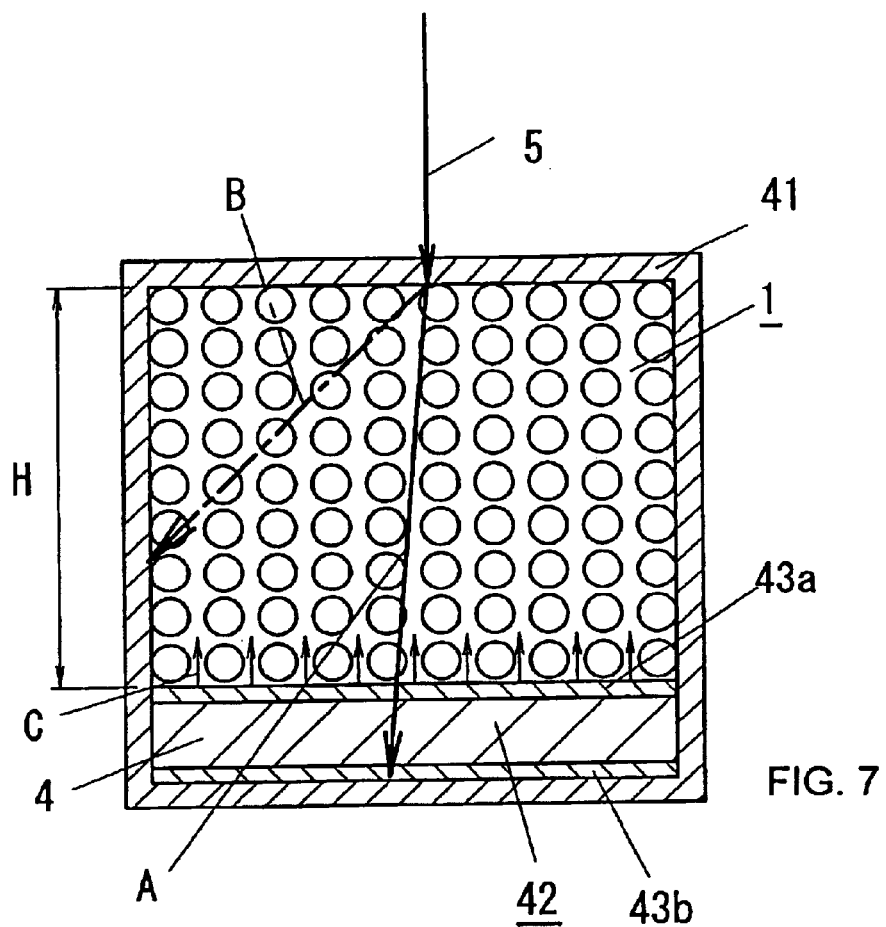
FIG. 7 is a schematic cross-sectional view of the light-beam deflecting device using a piezoelectric material according to another preferred embodiment of the present invention.

For example, as shown in FIG. 7, the deflection controller 4 of the present embodiment comprises a piezoelectric material 42 provided at one side of the photonic crystal, a pair of electrodes 43a, 43b disposed on opposite surfaces of the piezoelectric material, power source (not shown) for applying a voltage between the electrodes, and a voltage controller (not shown). The electrode 43a is put between the piezoelectric material 42 and the photonic crystal 1. In FIG. 7, the numeral 41 designates a supporting member for incorporating the piezoelectric material and the photonic crystal therein. It is preferred that the piezoelectric material 42, electrodes 43a, 43b and the supporting member 41 are made of a material that is optically transparent to the incident light beam 5.

As the piezoelectric material, for example, it is possible to use PZT ceramics such as $Pb(Zr_{0.52}, Ti_{0.48})O_3$. It is preferred that the PZT ceramics has a piezoelectric constant of $-400 \times 10^{-12}$ to $1000 \times 10^{-12}$ m/V. As an example, when a PZT ceramic plate having the thickness of 10 mm is used as the piezoelectric material, and a voltage is applied between the electrodes 43a, 43b to apply an electric field of 1000 V/mm to the piezoelectric material, the thickness dimension of the piezoelectric material 42 changes by about 5 $\mu$m. At this time, when a thickness of the photonic crystal 1 is 5 mm, the thickness dimension (H) of the photonic crystal changes by about 0.1%. This is sufficient to change the period of the photonic crystal.

In the deflection controller 4 described above, the dimensions of the photonic crystal 1 (=a period of the photonic crystal 1) can be changed by expansion and contraction in the thickness direction of the piezoelectric material 42. An amount of the expansion and contraction of the piezoelectric material can be controlled by the voltage controller. That is, when a light beam 5 having a required wavelength is incident on the photonic crystal 1 under a condition that the voltage is not applied between the electrodes 43a, 43b, the light beam passes through the photonic crystal along a first optical path shown by the solid arrow A in FIG. 7. On the other hand, when the voltage is applied between the electrodes (43a, 43b), the piezoelectric material gives a compression stress to the photonic crystal 1, as shown by the arrows C in FIG. 7, to change the photonic band structure.

As a result, the light beam 5 incident on the photonic crystal 1 is deflected to pass through the photonic crystal along a second optical path shown by the dotted arrow B in FIG. 7.

In other words, when the light beam incident on the photonic crystal has the specified wavelength, it propagates through the photonic crystal along a direction of potential gradient of an energy dispersion surface, which is an equal-energy surface of bands in the wave number space of the photonic crystal. That is, the light propagating through the photonic crystal travels across the energy dispersion surface. In the present embodiment, the period of the photonic crystal is changed by changes in dimension of the photonic crystal, so that the energy dispersion surface changes (=expands and contracts) to deflect the light beam 5 incident on the photonic crystal.

Thus, according to the deflection controller 4 of the present embodiment, the deflection angle of the light beam 5 incident on the photonic crystal 1 can be controlled by adjusting amounts of changes in dimension of the photonic crystal. In addition, when the piezoelectric material 42 is activated, the period of the photonic crystal can be changed at high speed. This provides the light-beam deflection device having a quick responsivity. Moreover, since conventional piezoelectric elements are available to the deflection controller, there is an advantage of improving the cost/performance of the light-beam deflection device.

A modification of the above deflection controller using the piezoelectric material of the present invention is introduced below.

Figure 8:
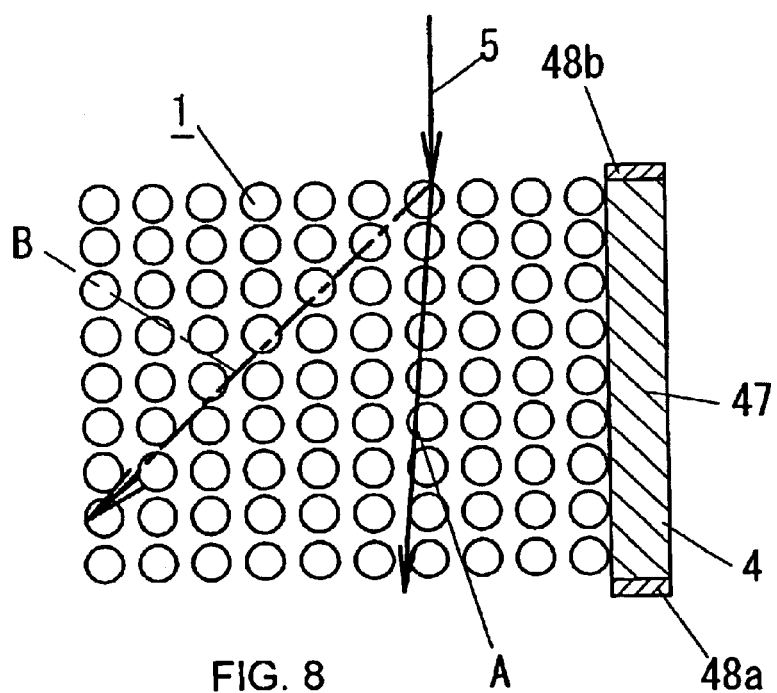
FIG. 8 is a schematic cross-sectional view illustrating a modification of the light-beam deflecting device of FIG. 7.

The deflection controller 4 of this modification comprises a substrate 47 of a piezoelectric material having a top surface, on which the photonic crystal 1 is placed, and a pair of electrodes 48a, 48b disposed at opposite sides of the substrate, as shown in FIG. 8. In this case, changes in dimension of the photonic crystal 1 are provided by expansion and contraction caused in the thickness direction of the piezoelectric substrate 47. In comparison with a case that the piezoelectric element is separately provided from the substrate 47 for supporting the photonic crystal 1, the deflection controller 4 of this embodiment has a simplified structure and exhibits excellent cost/performance. It is preferred that the substrate 47 and the electrodes 48a, 48b are made of a material that is optically transparent to the incident light beam 5.

As an example, when a PZT ceramic substrate 47 having a square shape (5 mm×5 mm) is used, and an electric field of 2000 V/mm is applied to the PZT ceramic substrate 47 through the electrodes 48a, 48b, the thickness dimension of the PZT ceramic substrate 47 changes by about 5 $\mu$m. At this time, the dimension of the photonic crystal changes by about 0.1%. This is sufficient to change the period of the photonic crystal. The deflection controller 4 of this modification can be operated in a similar manner to the deflection controller of FIG. 7.

As another preferred embodiment of the external-force applying unit of the present invention, it is preferred that the external-force applying unit comprises a pair of electromagnets disposed at opposites sides of the photonic crystal. In this case, a mechanical stress can be applied to the photonic crystal by an attraction force generated between the electromagnets.

Figure 9:
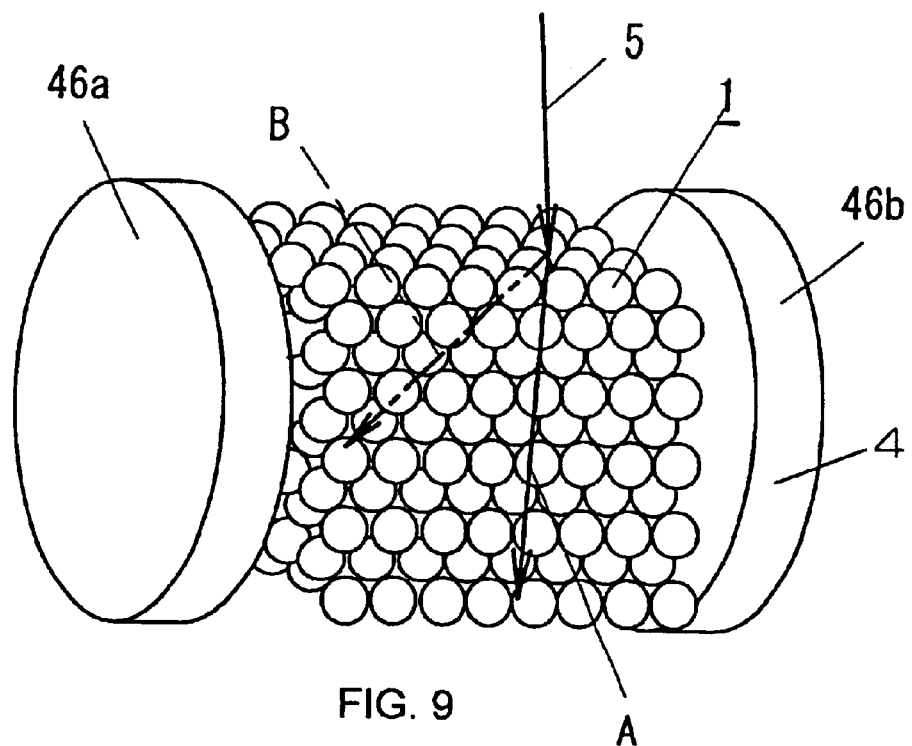
FIG. 9 is a schematic perspective view of the light-beam deflecting device using electromagnets according to another preferred embodiment of the present invention.

For example, the deflection controller 4 of the present embodiment comprises the pair of electromagnets 46a, 46b disposed at the opposite sides of the photonic crystal 1, power source (not shown) for supplying electric current to coils for the electromagnets, and a current controller (not shown), as shown in FIG. 9. In this case, changes in dimension of the photonic crystal are caused by the attraction force generated by energizing the electromagnets. Therefore, the deflection angle of the light beam 5 incident on the photonic crystal can be controlled by adjusting a magnitude of the attraction force.

According to the deflection controller 4 described above, since a distance between the electromagnets 46a, 46b is decreased by energizing the electromagnets, the photonic crystal receives a compression stress. This compression stress causes changes in dimension of the photonic crystal 1, so that the period of the photonic crystal changes. That is, when a light beam 5 having a required wavelength is incident on the photonic crystal 1 under a condition that the electromagnets 46a, 46b are not energized, the light beam passes through the photonic crystal along a first optical path shown by the solid arrow A in FIG. 9. On the other hand, when the electromagnets 46a, 46b are energized, the electromagnets give the compression stress to the photonic crystal 1. As a result, the light beam 5 incident on the photonic crystal is deflected to pass through the photonic crystal along a second optical path shown by the dotted arrow B in FIG. 9.

Thus, in the present embodiment, changes in dimension of the photonic crystal are controlled by adjusting an amount of electric current supplied to the electromagnets to obtain a desired deflection angle of the light beam incident on the photonic crystal. Therefore, it is possible to realize a compact light-beam deflection device having a quick responsivity.

As another preferred embodiment of the deflection controller of the present invention, it is preferred that the deflection controller comprises a heater for heating the photonic crystal, and a heater controller for controlling a temperature of the photonic crystal to generate a thermal stress in the photonic crystal.

Figure 10:
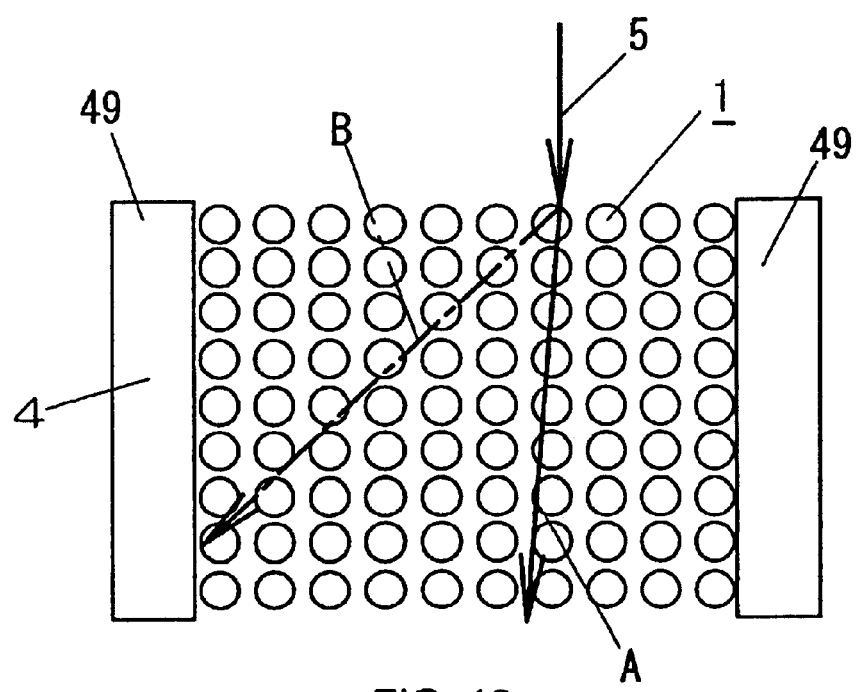
FIG. 10 is a schematic cross-sectional view of the light-beam deflecting device using a heater according to another preferred embodiment of the present invention.

For example, as shown in FIG. 10, the deflection controller 4 comprises a pair of heaters 49 disposed at opposite sides of the photonic crystal 1, power source (not shown) for supplying electric current to these heater, and a current controller (not shown). It is preferred that the heaters 49 are made of a material that is optically transparent to the incident light beam 5.

In this embodiment, it is preferred that two materials that make up the photonic crystal 1 have relatively large thermal-expansion coefficients. For example, the two materials may be polyethylene (thermal expansion coefficient: $100 \times 10^{-6} \sim 200 \times 10^{-6}$/K) and an acrylic (thermal expansion coefficient: about $80 \times 10^{-6}$/K). In this case, a thermal expansion of the photonic crystal is caused by energizing the heaters 49, so that changes in dimension of the photonic crystal are obtained. Therefore, the deflection angle of the incident light beam 5 in the photonic crystal 1 can be controlled by adjusting an amount of electric current supplied to the heaters 49. Thus, in the present embodiment, the dimension of the photonic crystal can be directly changed by the thermal expansion of the photonic crystal itself in place of applying a mechanical force to the photonic crystal from outside.

As an example, when it is required to change the dimension of the photonic crystal by 0.1% to about 1% to deflect the light beam incident on the photonic crystal, it is preferred to increase the temperature of the photonic crystal by 12.5 to 125 K with use of the heaters 49. As a result, a resulting thermal expansion of the photonic crystal can sufficiently change the photonic band structure thereof.

Alternatively, the deflection controller may comprise an external-force applying member of a material having a high thermal expansion coefficient, which is disposed to make contact with the photonic crystal, heater for heating the external-force applying member, power source for supplying electric current to the heater, and a current controller. In this case, the volume of the external-force applying member is increased by the thermal expansion of the heated external-force applying member, so that changes in dimension of the photonic crystal are caused. Therefore, the deflection angle of the light beam incident on the photonic crystal can be controlled by adjusting the heating temperature for the external-force applying member.

Figure 11:
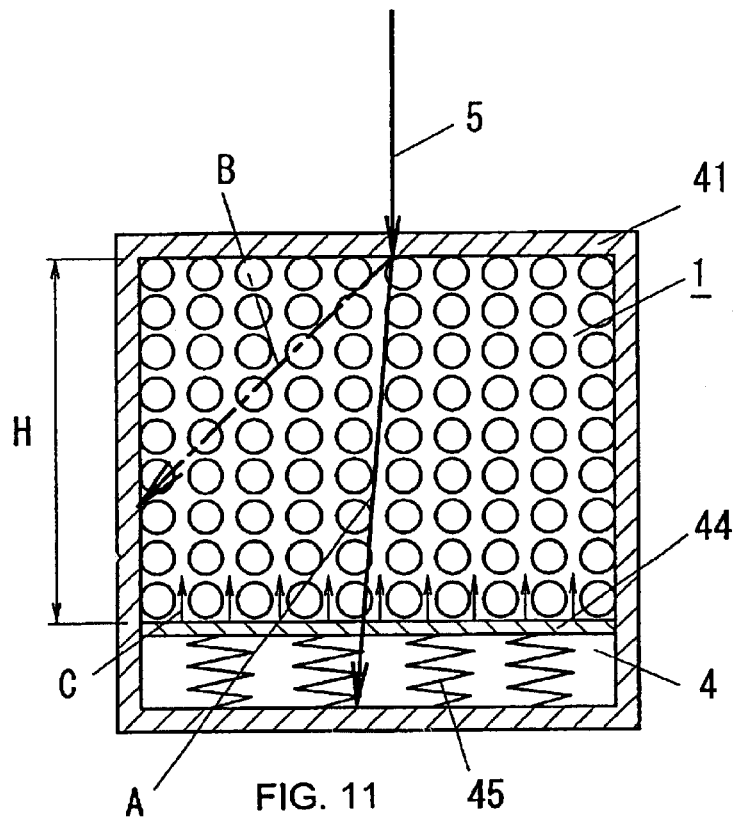
FIG. 11 is a schematic cross-sectional view of the light-beam deflecting device using an external-force applying unit according to another preferred embodiment of the present invention.

As another preferred embodiment of the deflection controller 4 of the present invention, an external-force applying unit shown in FIG. 11 may be used. That is, this external-force applying unit comprises a pressure board 44 disposed to abut against the photonic crystal 1, drive means 45 for moving the pressure board toward the photonic crystal to provide a compression stress to the photonic crystal, and a supporting member 41 for incorporating the photonic crystal 1, the pressure board 44 and the drive means 45 therein. In this case, changes in dimension of the photonic crystal 1 are caused by the movement of the pressure board 44 toward the photonic crystal. As the drive means 45, conventional pressure means such as pistons controlled by air pressure, hydraulic pressure, or oil hydraulic pressure can be used. It is preferred that the pressure board 44, the drive unit 45, and the supporting member 41 are made of a material that is optically transparent to the incident light beam 5.

In the deflection controller 4 described above, when a light beam 5 having a specified wavelength is incident on the photonic crystal 1 under a condition that the drive means 45 is not operated, the light beam passes through the photonic crystal along a first optical path shown by the solid arrow A in FIG. 11. On the other hand, when the drive means 45 is operated, the pressure board 44 gives a compression stress to the photonic crystal 1, as shown by the arrows C in FIG. 11, to change the photonic band structure thereof. As a result, the light beam 5 incident on the photonic crystal is deflected to pass through the photonic crystal along a second optical path shown by the dotted arrow B in FIG. 11. Therefore, the deflection angle of the light beam incident on the photonic crystal can be controlled by adjusting a travel amount of the pressure board 44, or a magnitude of pressure applied to the photonic crystal 1 through the pressure board 44.

As another preferred embodiment of the deflection controller of the present invention, when the photonic crystal contains a semiconductor material such as Si and GaAs, it is preferred that the deflection controller injects carriers into the photonic crystal to change a refractive index of the photonic crystal.

Figure 12:
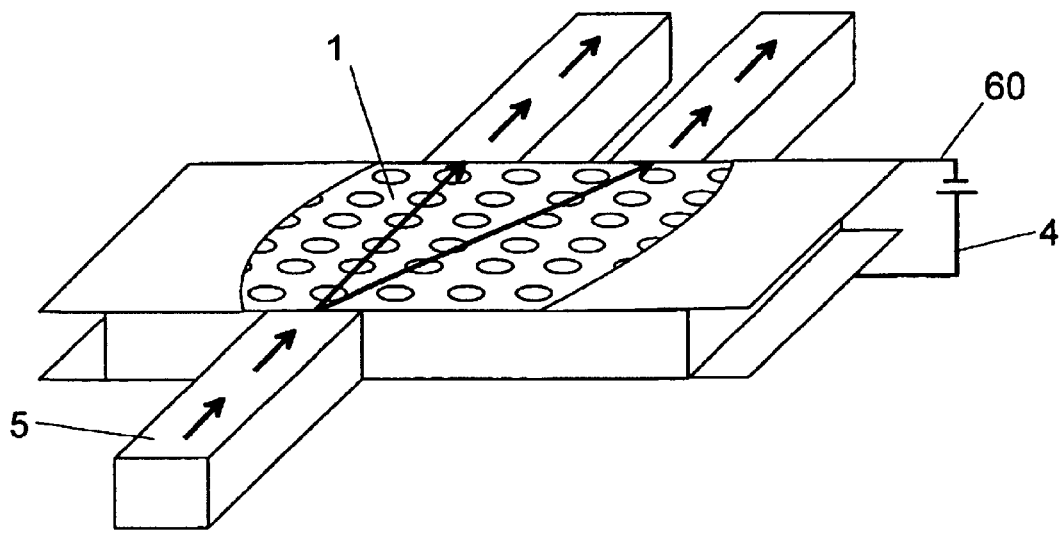
FIG. 12 is a schematic perspective view of the light-beam deflecting device using a carrier injection unit according to another preferred embodiment of the present invention.

For example, as shown in FIG. 12, this deflection controller 4 comprises an electric circuit 60 for injecting carriers such as electrons into the photonic crystal 1. In this case, the photonic band structure of the photonic crystal is changed in response to the injection amounts of the carriers into the photonic crystal. Therefore, the deflection angle of the light beam 5 incident on the photonic crystal can be controlled by adjusting the amount of electric current flowing through the electric circuit 60, i.e., the injection amounts of the carriers into the photonic crystal 1.

In this embodiment, since popular elements for integrated circuits such as Si or Ge are used as the materials that make up the photonic crystal, there are advantages that existing semiconductor manufacturing lines can be used to produce the light-beam deflecting device with the photonic crystal, and also integration becomes easier. In addition, it becomes possible to provide the light-beam deflecting device having a switching speed on the order of nano- or pico-second.

As another preferred embodiment of the deflection controller of the present invention, when the photonic crystal comprises a light-refractive material, it is preferred that the deflection controller irradiates light to the photonic crystal to change a refractive index of the photonic crystal.

Figure 13:
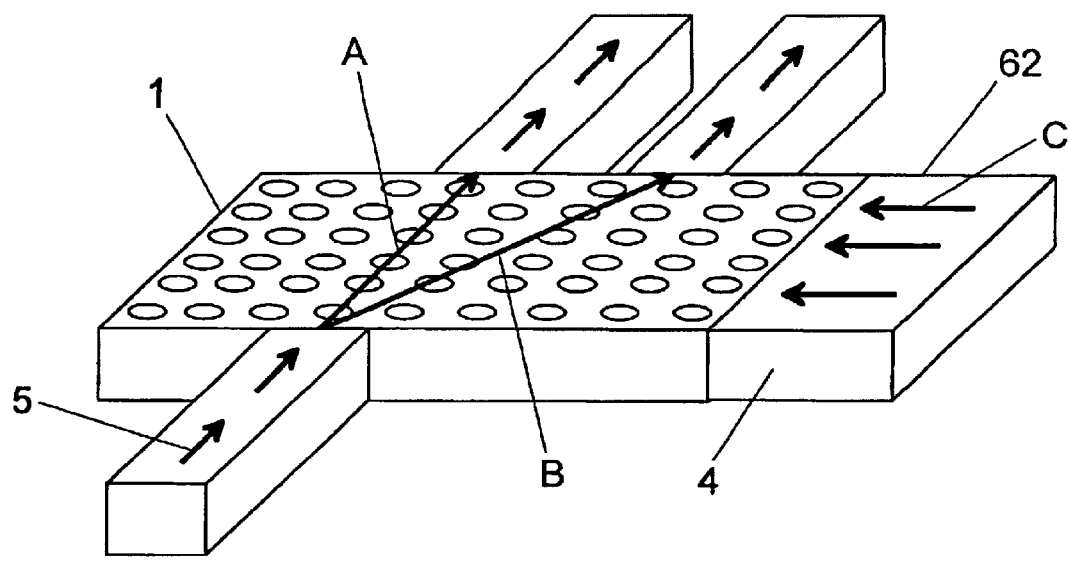
FIG. 13 is a schematic perspective view of the light-beam deflecting device using a light-irradiating unit according to another preferred embodiment of the present invention.

For example, as shown in FIG. 13, this deflection controller 4 comprises an irradiation unit (not shown) for irradiating light to the photonic crystal 1. In this case, the photonic band structure of the photonic crystal is changed in response to an amount of the light irradiated to the photonic crystal. Therefore, the deflection angle of the light beam 5 incident on the photonic crystal can be controlled by adjusting the light amount irradiated. The light may be irradiated to the photonic crystal 1 from above or side. Alternatively, the light may be irradiated to the photonic crystal through a wave guide 62 disposed adjacent to the photonic crystal, as shown by the arrow C in FIG. 13.

In the present embodiment, there is an advantage that the light-beam deflecting device having a switching speed on the order of nano- or pico-second can be realized. In addition, the light-beam deflecting device having the deflection controller 4 of this embodiment is adaptable to the All-optical Packet Switching Network.

Figure 14:
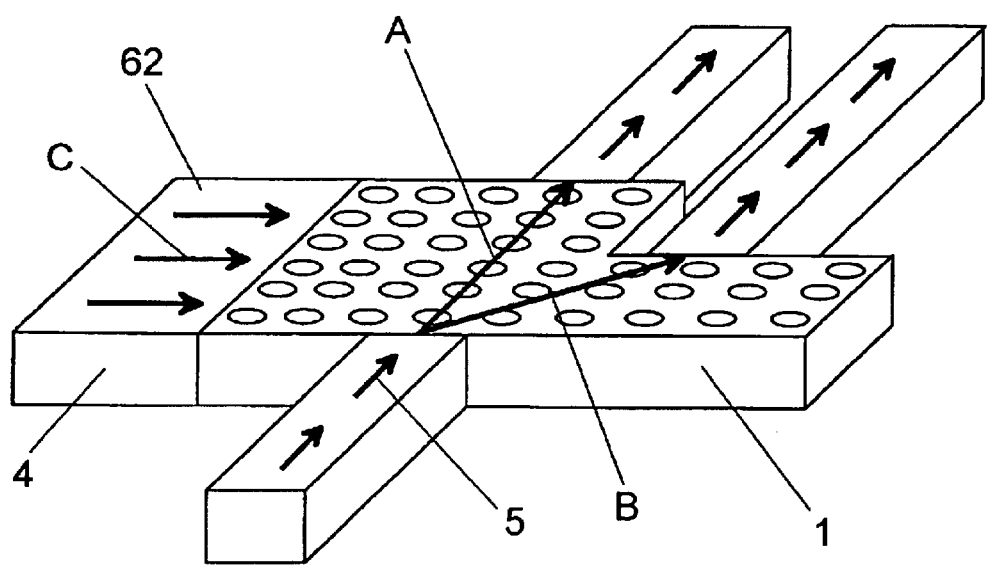
FIG. 14 is a schematic perspective view of a preferred structure of the photonic crystal for the light-beam deflecting device of the present invention.

With respect to each of the deflection controller described above, as shown in FIG. 14, it is preferred that the photonic crystal 1 is shaped to provide at least two optical paths (A, B) therein, which have substantially a same linear distance between an incident position where the light beam 5 is incident and a projecting position where the transmitted light beam is output. Since each of the optical paths (A, B) has a constant length, it is possible to prevent the phase shift. In FIG. 14, a corner portion of the rectangular photonic crystal 1 is removed such that two optical paths shown by the arrows (A, B) have a constant length. As the deflection controller 4, the irradiation unit (not shown) may irradiate light to the photonic crystal 1 through the wave guide 62, as shown by the arrow C in FIG. 14.

It is particularly preferred to apply the light-beam deflecting device of the present invention to an optical switch. That is, this optical switch comprises the light-beam deflecting device of the present invention, an optical input terminal provided at an incident side of the photonic crystal of the light-beam deflecting device, through which the photonic crystal receives the light-beam, and a plurality of optical output terminals provided at a side other than the incident side of the photonic crystal, from which the transmitted light beam is selectively output.

Figure 15A:
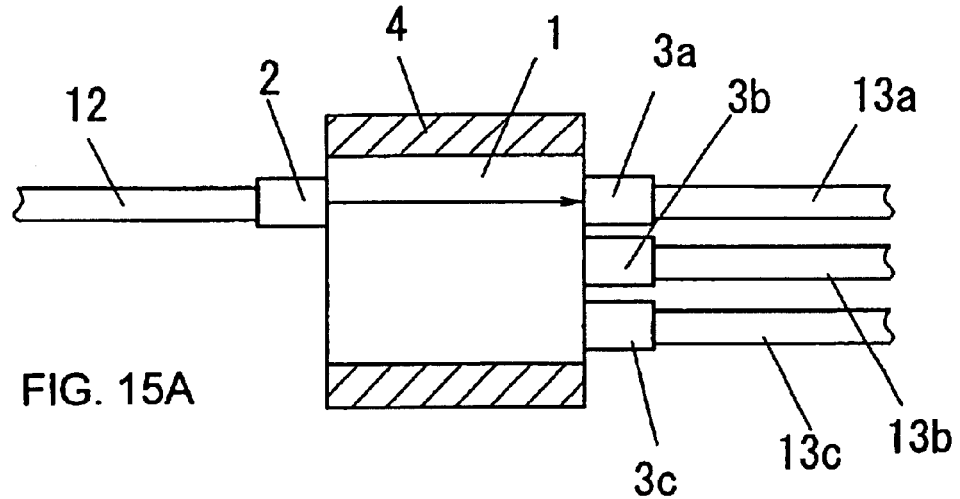
FIGS. 15A to 15C are cross-sectional views showing operations of an optical switch using the light-beam deflecting device of the present invention.
Figure 15B:
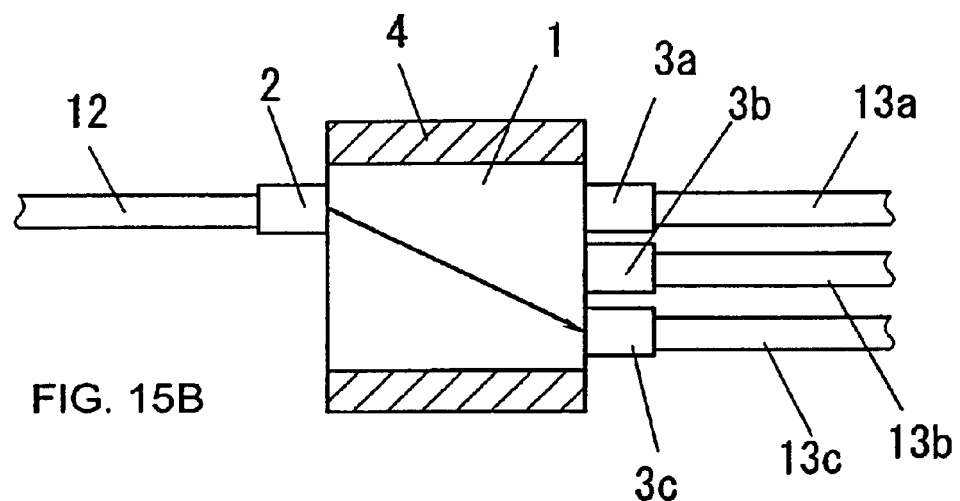
Figure 15C:
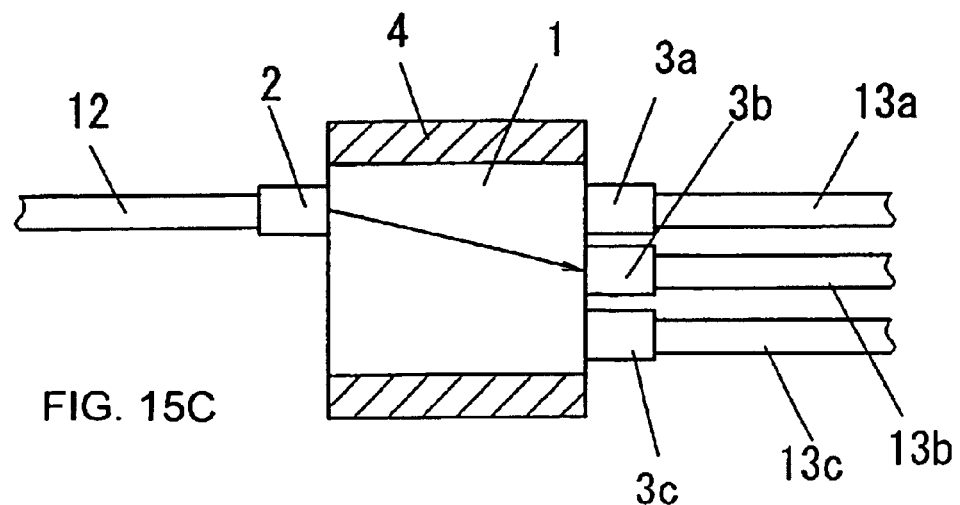

An embodiment of the optical switch of the present invention is shown in FIG. 15. At an input side of the optical switch, there is a single optical input terminal 2 such as a rod lens for allowing a light beam provided from an optical fiber 12 to be incident on a side of the photonic crystal, and at an output side of the optical switch, there are three optical output terminals 3a, 3b, 3c such as rod lenses, each of which provides a transmitted light beam from the other side of the photonic crystal to a corresponding optical fiber 13a, 13b, 13c. The deflection controller 4 is disposed at top and bottom sides of the photonic crystals 1.

This optical switch can provide three different outputs from one incident light beam by controlling the photonic band structure of the photonic crystal 1. That is, in the case of FIG. 15A, the transmitted light beam is output from the output terminal 3a to the corresponding optical fiber 13a, as shown by the arrow. Therefore, no transmitted light beam is output from the remaining output terminals 3b, 3c. Similarly, in the case of FIG. 15B, the transmitted light beam is output from the output terminal 3c to the corresponding optical fiber 13c, as shown by the arrow. Therefore, no transmitted light beam is output from the remaining output terminals 3a, 3b. Additionally, in the case of FIG. 15C, the transmitted light beam is output from the output terminal 3b to the corresponding optical fiber 13b, as shown by the arrow. Therefore, no transmitted light beam is output from the remaining output terminals 3a, 3c. Thus, this optical switch has the capability of selectively providing three different output signals from one input signal. As a modification of this embodiment, the number of optical output terminals may be two, or more than three.

In the optical switch of the present invention, it becomes possible to switch among plural optical paths in the photonic crystal, each of which forms a different deflection angle with respect to the incident light beam. In comparison with a conventional optical switch using wave guides, it is possible to achieve downsizing of the optical switch, while providing a relatively large deflection angle. In addition, there are advantages of preventing cross talk of optical signals and ensuring a high transmitting efficiency.

Figure 16:
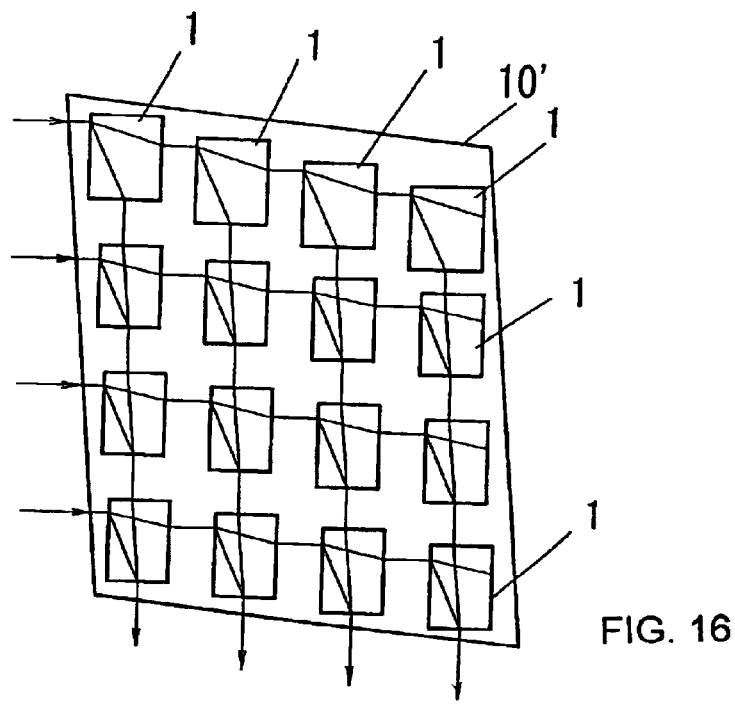
FIG. 16 is a plan view of a matrix-type optical switch using the light-beam deflecting device of the present invention.
Figure 17:
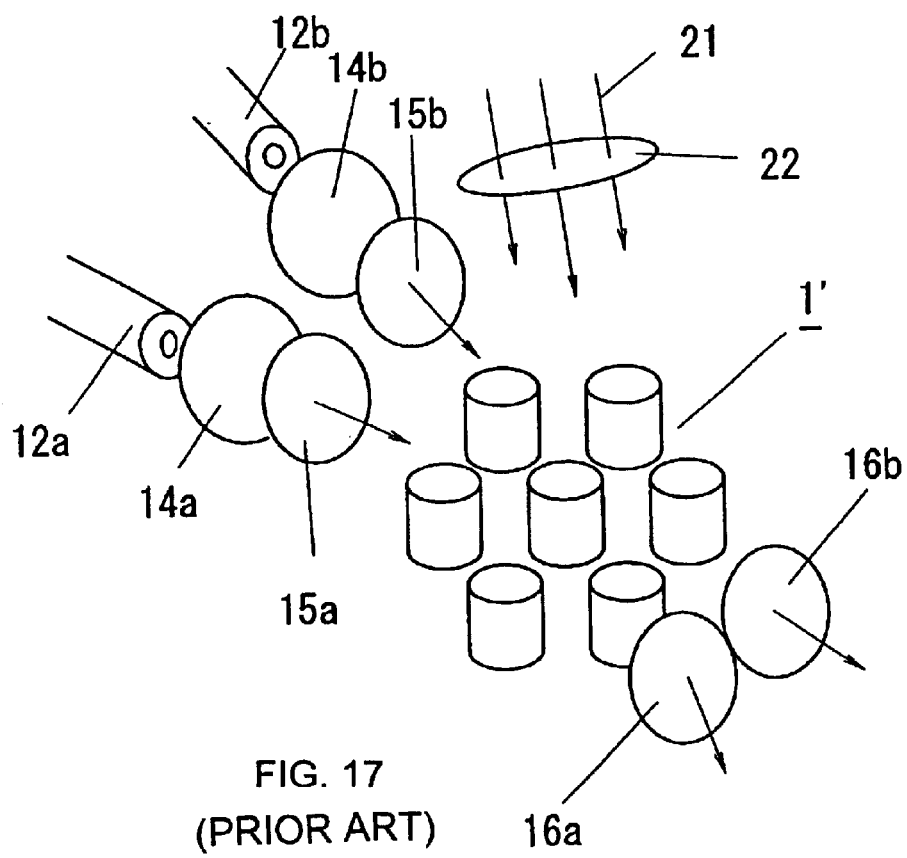
FIG. 17 is a schematic perspective view illustrating a conventional optical switch using a photonic crystal.

Another embodiment of the optical switch of the present invention is shown in FIG. 16. The optical switch of FIG. 15 uses a single photonic crystal, and selectively provides plural different output signals from one input signal. On the other hand, the optical switch of this embodiment uses a matrix arrangement of the photonic crystals and has the capability of selectively providing plural different output signals from plural input signals.

That is, as shown in FIG. 16, this optical switch comprises a matrix arrangement of a plurality of light-beam deflecting devices of the present invention, optical input terminals provided at a side of the matrix arrangement to receive plural light beams from outside; and optical output terminals provided at the other side of the matrix arrangement. These photonic crystals 1 are formed in a single substrate 10'. In FIG. 16, the number of the photonic crystals 1 used in the matrix arrangement is 16 (=4×4), and 4 input terminals and 4 output terminals are provided on the respective sides of the matrix arrangement. The number of the photonic crystals 1, the number of the input terminals and/or the number of the output terminals can be appropriately determined.

According to this optical switch, since the light beam incident on the photonic crystal of each of the light-beam deflecting devices in the matrix arrangement is controlled by the deflection controller of the present invention, it is possible to simultaneously provide different optical output signals by switching among a larger number of optical paths in the matrix arrangement. Moreover, in comparison with conventional optical switches using drive means for operating plural deflection mirrors, it is possible to improve the reliability in switching operations. In addition, since a lot of photonic crystals 1 can be formed on a single substrate 10', it is possible to achieve considerable downsizing of the optical switch.

As understood from the above preferred embodiments, since the deflection controller of the present invention can change the photonic band structure to deflect a light beam (=incident light beam) incident on the photonic crystal, it is possible to provide a compact light-beam deflecting device having the capability of outputting a transmitted light beam which forms a relatively large angle with respect to the incident light beam. In addition, since a plurality of optical paths are set against one incident light beam by using different deflection angles, it is possible to provide a new optical switch with the photonic crystal, which has the capability of preventing cross talk of optical signals and ensuring a high transmitting efficiency.

What is claimed is:

1. A light-beam deflecting device comprising:
   a photonic crystal designed to have a photonic band gap wavelength that is different from a wavelength of a light beam to be incident on said photonic crystal, and such that when said light beam having the wavelength is incident on said photonic crystal, a large change in shape of a photonic dispersion surface of said photonic crystal occurs; and
   a deflection controller for applying an amount of energy to said photonic crystal to deflect said light beam incident on an incident side of said photonic crystal at a relatively large deflection angle, and provide a transmitted light beam from a side other than said incident side of said photonic crystal.

2. The light-beam deflecting device as set forth in claim 1, wherein said photonic crystal comprises at least two materials having different refractive indexes, and wherein said deflection controller controls a ratio of refractive index between said materials by applying the energy to said photonic crystal.

3. The light-beam deflecting device as set forth in claim 2, wherein at least one of said materials is an electro-optic material, and wherein said deflection controller applies an electric field to said photonic crystal as the energy.

4. The light-beam deflecting device as set forth in claim 2, wherein at least one of said materials is an acousto-optic material, and wherein said deflection controller applies ultrasonic waves to said photonic crystal as the energy.

5. The light-beam deflecting device as set forth in claim 1, wherein said photonic crystal comprises a semiconductor material, and wherein said deflection controller injects carriers into said photonic crystal to change a refractive index of said photonic crystal.

6. The light-beam deflecting device as set forth in claim 1, wherein said photonic crystal comprises a light-refractive material, and wherein said deflection controller irradiates light to said photonic crystal to change a refractive index of said photonic crystal.

7. The light-beam deflecting device as set forth in claim 1, wherein said deflection controller applies the energy to said photonic crystal to cause changes in dimension of said photonic crystal.

8. The light-beam deflecting device as set forth in claim 7, wherein said deflection controller comprises an external-force applying means for applying an external force as the energy to said photonic crystal.

9. The light-beam deflecting device as set forth in claim 8, wherein said external-force applying means comprises a piezoelectric material disposed adjacent to said photonic crystal.

10. The light-beam deflecting device as set forth in claim 8, wherein said external-force applying means comprises a pair of electromagnets disposed at opposite sides of said photonic crystal, and wherein a mechanical stress is applied to said photonic crystal by an attraction force generated between said electromagnets.

11. The light-beam deflecting device as set forth in claim 8, wherein said external-force applying means comprises a material having a high thermal expansion coefficient disposed to make contact with said photonic crystal, and a heater for heating said material, and wherein the external force is applied to said photonic crystal by the thermal expansion of said material heated by said heater.

12. The light-beam deflecting device as set forth in claim 1, wherein said deflection controller comprises a heater for heating said photonic crystal, and a heater controller for controlling a temperature of said photonic crystal to generate a thermal stress in said photonic crystal.

13. The light-beam deflecting device as set forth in claim 1, wherein said photonic crystal is shaped to provide at least two optical paths therein, which have substantially a same linear distance between an incident position where said light beam is incident and a projecting position where said transmitted light beam is output.

14. An optical switch using the light-beam deflecting device set forth in claim 1 comprising:

an optical input terminal provided at the incident side of said photonic crystal of the light-beam deflecting device, through which said photonic crystal receives said light-beam; and a plurality of optical output terminals provided at the side other than said incident side of said photonic crystal, from which said transmitted light beam is selectively output.

15. An optical switch using the light-beam deflecting device set forth in claim 1 comprising:

an optical input terminal provided at the incident side of said photonic crystal, through which said photonic crystal receives said light beam; and at least two optical output terminals comprising a first optical output terminal provided at a side other than said incident side of said photonic crystal to output a first transmitted light beam passing through said photonic crystal, and a second optical output terminal provided at a side other than said incident side of said photonic crystal to output a second transmitted light beam, which forms a desired angle with respect to said light beam, and has a different direction from said first transmitted light beam.

16. An optical switch comprising:

a matrix arrangement of a plurality of light-beam deflecting devices, each of which is set forth in claim 1;

optical input terminals provided at a side of said matrix arrangement to receive plural light beams from outside; and optical output terminals provided at the other side of said matrix arrangement.

17. A method of deflecting a light beam with a photonic crystal, said method comprising the steps of:

designing said photonic crystal to have a photonic band gap wavelength that is different from a wavelength of light beam to be incident on said photonic crystal, and such that when said light beam having the wavelength is incident on said photonic crystal, a large change in shape of a photonic dispersion surface of said photonic crystal occurs;

providing said light beam on a side of said photonic crystal; and deflecting said light beam incident on the side of said photonic crystal at a relatively large deflection angle by applying an amount of energy to said photonic crystal to provide a transmitted light beam from the other side of said photonic crystal.

18. A light-beam deflecting device comprising:

a photonic crystal designed to have a photonic band gap wavelength that is different from a wavelength of a light beam to be incident on said photonic crystal;

a deflection controller for applying an amount of energy to said photonic crystal to deflect a light beam incident on an incident side of said photonic crystal at a relatively large deflection angle, and provide a transmitted light beam from a side other than said incident side of said photonic crystal;

an optical input terminal provided at the incident side of said photonic crystal of the light-beam deflecting device, through which said photonic crystal receives said light-beam; and a plurality of optical output terminals provided at the side other than said incident side of said photonic crystal, from which said transmitted light beam is selectively output.

19. A light-beam deflecting device comprising:

a photonic crystal designed to have a photonic band gap wavelength that is different from a wavelength of a light beam to be incident on said photonic crystal, and a deflection controller for applying an amount of energy to said photonic crystal to deflect a light beam incident on an incident side of said photonic crystal, and provide a transmitted light beam, which forms a desired angle with respect to said light beam, from a side other than said incident side of said photonic crystal, wherein said photonic crystal comprises at least two materials having different refractive indexes, and wherein said deflection controller controls a ratio of refractive index between said materials by applying the energy to said photonic crystal, and wherein at least one of said materials is an acousto-optic material, and wherein said deflection controller applies ultrasonic waves to said photonic crystal as the energy.

20. A light-beam deflecting comprising:

a photonic crystal designed to have a photonic band gap wavelength that is different from a wavelength of a light beam to be incident on said photonic crystal, and a deflection controller for applying an amount of energy to said photonic crystal to deflect a light beam incident on an incident side of said photonic crystal, and provide a transmitted light beam, which forms a desired angle with respect to said light beam, from a side other than said incident side of said photonic crystal, wherein said photonic crystal comprises a semiconductor material, and wherein said deflection controller injects carriers into said photonic crystal to change a refractive index of said photonic crystal.

21. The light-beam deflecting device comprising:

a photonic crystal designed to have a photonic band gap wavelength that is different from a wavelength of a light beam to be incident on said photonic crystal, and a deflection controller for applying an amount of energy to said photonic crystal to deflect a light beam incident on an incident side of said photonic crystal, and provide a transmitted light beam, which forms a desired angle with respect to said light beam, from a side other than said incident side of said photonic crystal, wherein said photonic crystal comprises a light-refractive material, and wherein said deflection controller irradiates light to said photonic crystal to change a refractive index of said photonic crystal.

22. The light-beam deflecting device comprising:
- a photonic crystal designed to have a photonic band gap wavelength that is different from a wavelength of a light beam to be incident on said photonic crystal, and
- a deflection controller for applying an amount of energy to said photonic crystal to deflect a light beam incident on an incident side of said photonic crystal, and provide a transmitted light beam, which forms a desired angle with respect to said light beam, from a side other than said incident side of said photonic crystal,
- wherein said deflection controller applies the energy to said photonic crystal to cause changes in dimension of said photonic crystal.

23. The light-beam deflecting device as set forth in claim 22, wherein said deflection controller comprises an external-force applying means for applying an external force as the energy to said photonic crystal.

24. The light-beam deflecting device as set forth in claim 23, wherein said external-force applying means comprises a piezoelectric material disposed adjacent to said photonic crystal.

25. The light-beam deflecting device as set forth in claim 23, wherein said external-force applying means comprises a pair of electromagnets disposed at opposite sides of said photonic crystal, and wherein a mechanical stress is applied to said photonic crystal by an attraction force generated between said electromagnets.

26. The light-beam deflecting device as set forth in claim 23, wherein said external-force applying means comprises a material having a high thermal expansion coefficient disposed to make contact with said photonic crystal, and a heater for heating said material, and wherein the external force is applied to said photonic crystal by the thermal expansion of said material heated by said heater.

27. The light-beam deflecting device comprising:
- a photonic crystal designed to have a photonic band gap wavelength that is different from a wavelength of a light beam to be incident on said photonic crystal, and
- a deflection controller for applying an amount of energy to said photonic crystal to deflect a light beam incident on an incident side of said photonic crystal, and provide a transmitted light beam, which forms a desired angle with respect to said light beam, from a side other than said incident side of said photonic crystal,
- wherein said deflection controller comprises a heater for heating said photonic crystal, and a heater controller for controlling a temperature of said photonic crystal to generate a thermal stress in said photonic crystal.

28. The light-beam deflecting device comprising:
- a photonic crystal designed to have a photonic band gap wavelength that is different from a wavelength of a light beam to be incident on said photonic crystal, and
- a deflection controller for applying an amount of energy to said photonic crystal to deflect a light beam incident on an incident side of said photonic crystal, and provide a transmitted light beam, which forms a desired angle with respect to said light beam, from a side other than said incident side of said photonic crystal,
- wherein said photonic crystal is shaped to provide at least two optical paths therein, which have substantially a same linear distance between an incident position where said light beam is incident and a projecting position where said transmitted light beam is output.

29. An optical switch using a light-beam deflecting device including a photonic crystal, designed to have a photonic band gap wavelength that is different from a wavelength of a light beam to be incident on said photonic crystal, and a deflection controller for applying an amount of energy to said photonic crystal to deflect a light beam incident on an incident side of said photonic crystal, and provide a transmitted light beam, which forms a desired angle with respect to said light beam, from a side other than said incident side of said photonic crystal, the optical switch comprising:
- an optical input terminal provided at the incident side of said photonic crystal of the light-beam deflecting device, through which said photonic crystal receives said light-beam; and
- a plurality of optical output terminals provided at the side other than said incident side of said photonic crystal, from which said transmitted light beam is selectively output.

30. An optical switch using the light-beam deflecting device including a photonic crystal designed to have a photonic band gap wavelength that is different from a wavelength of a light beam to be incident on said photonic crystal, and a deflection controller for applying an amount of energy to said photonic crystal to deflect a light beam incident on an incident side of said photonic crystal, and provide a transmitted light beam, which forms a desired angle with respect to said light beam, from a side other than said incident side of said photonic crystal, the optical switch comprising:
- an optical input terminal provided at the incident side of said photonic crystal, through which said photonic crystal receives said light beam; and
- at least two optical output terminals comprising a first optical output terminal provided at a side other than said incident side of said photonic crystal to output a first transmitted light beam passing through said photonic crystal, and a second optical output terminal provided at a side other than said incident side of said photonic crystal to output a second transmitted light beam, which forms a desired angle with respect to said light beam, and has a different direction from said first transmitted light beam.

31. An optical switch comprising:
- a matrix arrangement of a plurality of light-beam deflecting devices, each of which comprises:
  - a photonic crystal designed to have a photonic band gap wavelength that is different from a wavelength of a light beam to be incident on said photonic crystal, and
  - a deflection controller for applying an amount of energy to said photonic crystal to deflect a light beam incident on an incident side of said photonic crystal, and provide a transmitted light beam, which forms a desired angle with respect to said light beam, from a side other than said incident side of said photonic crystal;
- optical input terminals provided at a side of said matrix arrangement to receive plural light beams from outside; and
- optical output terminals provided at the other side of said matrix arrangement.

* * * * *